United States Patent
Imamura

(10) Patent No.: US 11,205,968 B2
(45) Date of Patent: Dec. 21, 2021

(54) MATRIX CONVERTER CONTROL DEVICE AND POWER CONVERSION SYSTEM

(71) Applicant: Panasonic Semiconductor Solutions Co., Ltd., Kyoto (JP)

(72) Inventor: Katsuyuki Imamura, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 17/000,935

(22) Filed: Aug. 24, 2020

(65) Prior Publication Data

US 2020/0389096 A1 Dec. 10, 2020

Related U.S. Application Data

(63) Continuation of application No. PCT/JP2019/006421, filed on Feb. 20, 2019.

(30) Foreign Application Priority Data

Mar. 29, 2018 (JP) .............................. JP2018-064432

(51) Int. Cl.
  *H02M 5/293* (2006.01)
  *H02M 5/297* (2006.01)

(52) U.S. Cl.
  CPC .......... *H02M 5/293* (2013.01); *H02M 5/297* (2013.01); *H02M 5/2932* (2021.05)

(58) Field of Classification Search
  CPC .......... H02M 5/02; H02M 5/22; H02M 5/275; H02M 5/293; H02M 5/297; H02M 5/2932
  See application file for complete search history.

(56) References Cited

U.S. PATENT DOCUMENTS

| | | | |
|---|---|---|---|
| 2009/0091954 A1* | 4/2009 | Yamanaka | H02M 5/293 363/34 |
| 2003/0322276 | 12/2009 | Yamanaka | |
| 2013/0229835 A1* | 9/2013 | Yamanaka | H02M 5/297 363/37 |
| 2015/0102797 A1* | 4/2015 | Kinomura | H02M 5/293 323/311 |

FOREIGN PATENT DOCUMENTS

| | | |
|---|---|---|
| JP | 2004-229482 A | 8/2004 |
| JP | 2016-220324 A | 12/2016 |
| WO | 2008/108147 A1 | 9/2008 |

OTHER PUBLICATIONS

International Search Report issued in corresponding International Patent Application No. PCT/JP2019/006421, dated Apr. 16, 2019, with English translation.

* cited by examiner

*Primary Examiner* — Adolf D Berhane
(74) *Attorney, Agent, or Firm* — cLermott Will & Emery LLP

(57) ABSTRACT

A matrix converter control device includes a plurality of delay circuits which correspond to logic change timings of a plurality of input pulse width modulation (PWM) signals for controlling ON and OFF states of a plurality of switching elements included in a matrix converter. Specifically, the plurality of delay circuits are a first delay circuit, a second delay circuit, a third delay circuit, a fourth delay circuit, and a fifth delay circuit. Each of the plurality of delay circuits delays an input PWM signal by an amount of delay set for the delay circuit at a logic change timing corresponding to the delay circuit.

6 Claims, 13 Drawing Sheets

MATRIX CONVERTER CONTROL DEVICE AND POWER CONVERSION SYSTEM

CROSS REFERENCE TO RELATED APPLICATIONS

This application is a U.S. continuation application of PCT International Patent Application Number PCT/JP2019/006421 filed on Feb. 20, 2019, claiming the benefit of priority of Japanese Patent Application Number 2018-064432 filed on Mar. 29, 2018, the entire contents of which are hereby incorporated by reference.

BACKGROUND

1. Technical Field

The present disclosure relates to a matrix converter control device and a power conversion system including the same.

2. Description of the Related Art

A matrix converter has been proposed as a power conversion device capable of generating AC power of a new frequency from an AC power source. Japanese Unexamined Patent Application Publication No. 2016-220324 discloses a matrix converter capable of performing torque control on a rotary electrical machine even when the voltage of an AC power source becomes low.

SUMMARY

Since the matrix converter includes many switching elements, the control algorithm for controlling the matrix converter is complicated. Consequently, it is difficult to control the matrix converter using a general purpose integrated circuit or the like, and a customized integrated circuit, for example, is necessary.

The present disclosure provides a matrix converter control device having higher versatility and a power conversion system including the same.

A matrix converter control device according to an aspect of the present disclosure is a matrix converter control device including: a plurality of delay circuits which correspond to logic change timings of a plurality of pulse width modulation (PWM) signals for controlling ON and OFF states of a plurality of switching elements included in a matrix converter, wherein each of the plurality of delay circuits delays a target PWM signal included in the plurality of PWM signals by an amount of delay set for the delay circuit in a time period starting at one of the logic change timings which corresponds to the delay circuit, the target PWM signal being a signal for controlling a target switching element included in the plurality of switching elements.

A power conversion system according to an aspect of the present disclosure includes the matrix converter control device and the matrix converter.

The present disclosure realizes a matrix converter control device having high versatility and a power conversion system including the same.

BRIEF DESCRIPTION OF DRAWINGS

These and other objects, advantages and, features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
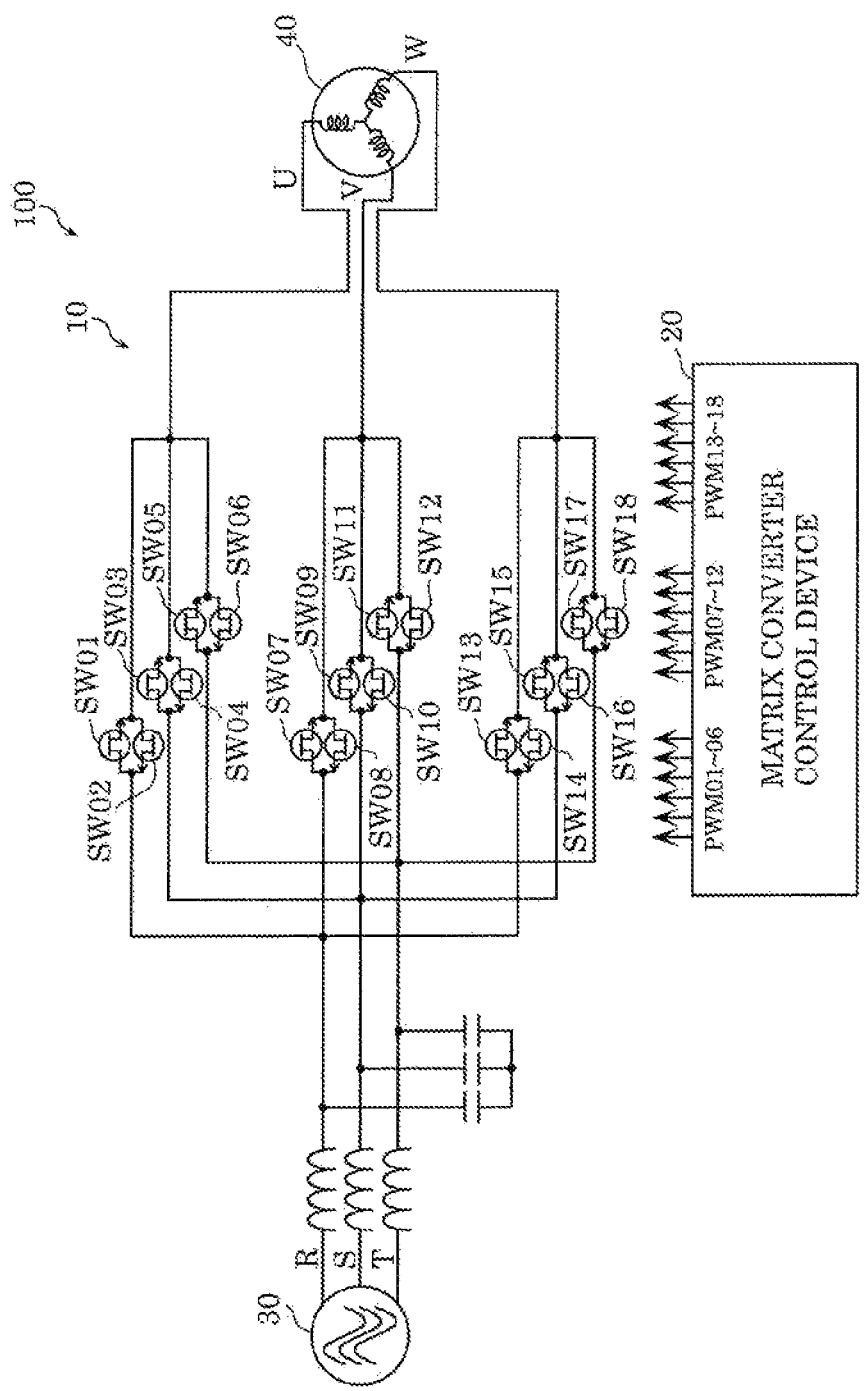
FIG. 1 illustrates a schematic configuration of a power conversion system according to an embodiment.

Hereinafter, embodiments will be described with reference to the drawings. Note that the embodiments described below each illustrate a general or specific example. The numerical values, shapes, materials, constituent elements, the arrangement and connection of the constituent elements, etc., illustrated in the embodiments below are mere examples, and are not intended to limit the present disclosure. Among the constituent elements in the following embodiments, those not recited in any one of the independent claims representing the most generic concepts will be described optional constituent elements.

Note that the drawings are represented schematically and are not necessarily precise illustrations, in the drawings, the same reference signs are given to essentially the same constituent elements, and redundant descriptions may be omitted or simplified.

EMBODIMENT

Overall Configuration

Hereinafter, a configuration of a power conversion system according to an embodiment will be described with reference to the drawings. FIG. 1 illustrates a schematic configuration of the power conversion system according to the embodiment.

As illustrated in FIG. 1, power conversion system 100 according to the embodiment includes matrix converter 10 and matrix converter control device 20. FIG. 1 also illustrates three-phase AC power source 30 and motor 40.

Matrix converter 10 is a power conversion circuit which converts three-phase AC power obtained from three-phase AC power source 30 into AC power which is different in frequency or voltage. Matrix converter 10 includes six switching elements (hereinafter simply referred to as SWs) for each of a first line (U), a second line (V), and a third line (W) of motor 40.

For example, matrix converter 10 includes SW01, SW02, SW03, SW04, SW05, and SW06 for the first line (U) of motor 40. Paired SW01 and SW02 constitute a bidirectional switch which electrically connects and disconnects a first line (R) of three-phase AC power source 30 and the first line (U) of motor 40. Paired SW03 and SW04 constitute a bidirectional switch which electrically connects and disconnects a second line (S) of three-phase AC power source 30 and the first line (U) of motor 40. Paired SW05 and SW06 constitute a bidirectional switch which electrically connects and disconnects a third line (T) of three-phase AC power source 30 and the first line (U) of motor 40.

Likewise, matrix converter 10 includes SW07, SW08, SW09, SW10, SW11, and SW12 for the second line (V) of motor 40. Matrix converter 10 also includes SW13, SW14, SW15, SW16, SW17, and SW18 for the third line (W) of motor 40.

Matrix converter control device 20 outputs PWM01 to PWM18 as pulse width modulation (PWM) output signals for controlling the ON and OFF states of SW01 to SW18. Note that SWs and PWMs correspond to one another by their numbers; for example, SW01 is turned on and off by PWM01. In the following description, an SW is turned on when the signal level of the corresponding PWM is high level, and turned off when the signal level of the corresponding PWM is low level.

Such power conversion system 100 is advantageous in that it is highly efficient because AC power conversion is necessary simply once. Power conversion system 100 is also advantageous in that harmonic current is suppressed because DC rectification is not performed. Moreover, power conversion system 100 does not include an electrolytic capacitor necessary for a three-phase inverter system. Electrolytic capacitors have a relatively short life span, and sometimes occupy 20% to 40% of the volume of the entire three-phase inverter system. Therefore, power conversion system 100 is also advantageous in that its life span can be extended and its size can be reduced.

Figure 2:
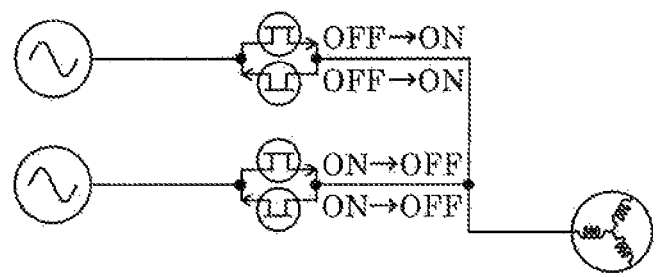
FIG. 2 illustrates a portion of a matrix converter.

Incidentally, matrix converter control device 20 performs commutation control. As illustrated in FIG. 2, in commutation control, matrix converter control device 20 switches SW01 and SW02 from the OFF state to the ON state, and switches SW03 and SW04 from the ON state to the OFF state. FIG. 2 illustrates a portion of matrix converter 10.

Figure 3:
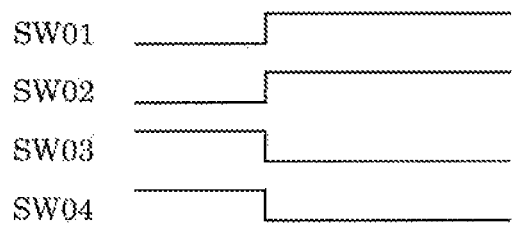
FIG. 3 illustrates an example of logic switch timings of PWM01 to PWM04.

In such commutation control, it is not possible for matrix converter control device 20 to simultaneously turn on SW01 and SW02 and turn off SW03 and SW04 by simultaneously changing the logics of PWM01 to PWM04 in the manner illustrated in FIG. 3. FIG. 3 illustrates an example of logic switch timings of PWM01 PWM04.

When SW01 and SW02 are turned on and SW03 and SW04 are turned off simultaneously, there is a risk of SW01 to SW04 all being instantaneously turned on (short-circuited), resulting in a short-circuit in the first line (U) and the second line (S). Moreover, there is also a risk of SW01 to SW04 all being instantaneously turned off (open), resulting in a loss of the return current path from motor 40. That is to say, when SW01 and SW02 are turned on and SW03 and SW04 are turned off simultaneously, there is a risk of a breakdown of matrix converter 10.

Figure 4:
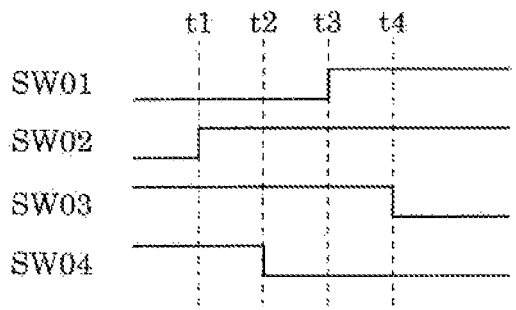
FIG. 4 illustrates an example of logic switch timings of PWM01 to PWM04 according to a voltage commutation method.
Figure 5:
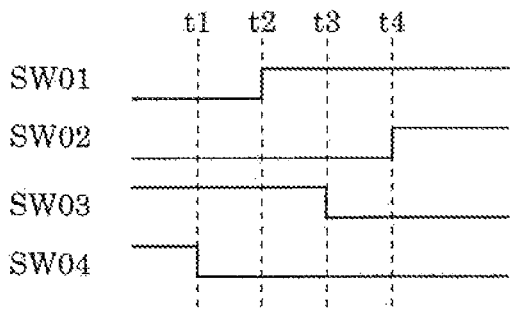
FIG. 5 illustrates an example of logic switch timings of PWM01 to PWM04 according to a current commutation method.

In view of this, matrix converter control device 20 makes the logic change timings of PWM01 to PWM04 different from one another in the commutation control. When, for example, commutation is performed based on the voltage magnitude, matrix converter control device 20 turns on SW01 and SW02 and turns off SW03 and SW04 by switching the logics of PWM01 to PWM04 at timings illustrated in FIG. 4. FIG. 4 illustrates an example of logic switch timings of PWM01 to PWM04 according to a voltage commutation method. When, for example, commutation is performed based on the current direction, matrix converter control device 20 turns on SW01 and SW02 and turns off SW03 and SW04 by switching the logics of PWM01 to PWM04 at timings illustrated in FIG. 5. FIG. 5 illustrates an example of logic switch timings of PWM01 to PWM04 according to a current commutation method.

Note that in the examples illustrated in FIG. 3 and FIG. 4, the commutation is performed with three time steps, namely, timing t1 to t2, timing t2 to t3, and timing t3 to t4; however, in other examples, the commutation 18 performed with four or more time steps.

Configuration of Matrix Converter Control Device

Figure 6:
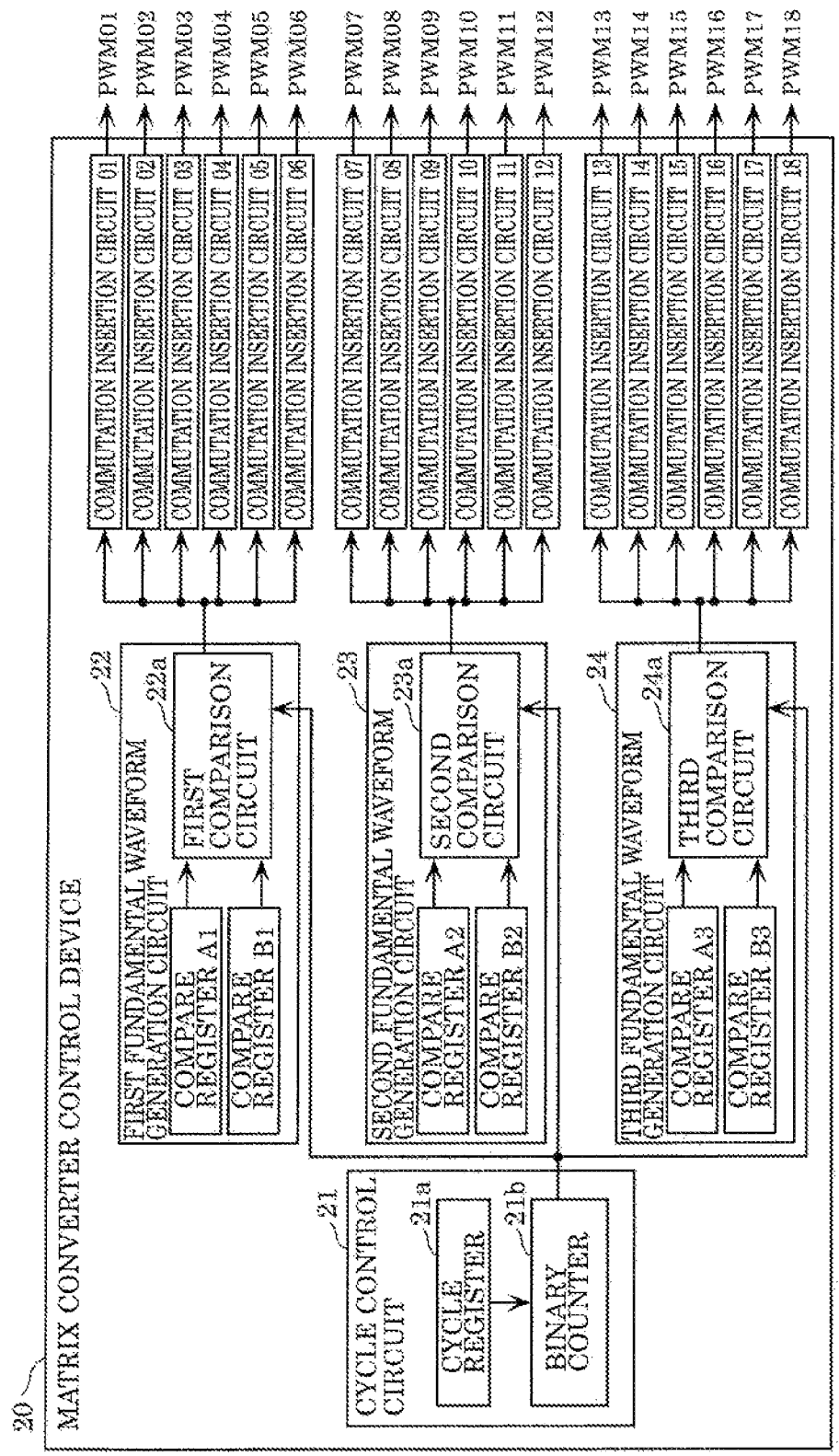
FIG. 6 illustrates a configuration of a matrix converter control device according to the embodiment.

Next, a configuration of matrix converter control device 20 will be described in detail. FIG. 6 illustrates a configuration of matrix converter control device 20.

As illustrated in FIG. 6, matrix converter control device 20 includes cycle control circuit 21, first fundamental waveform generation circuit 22, second fundamental waveform generation circuit 23, third fundamental waveform generation circuit 24, and commutation insertion circuits 01 to 18.

Cycle control circuit 21 includes cycle register 21a and binary counter 21b. Binary counter 21b counts up to a set value stored in cycle register 21a, and when the counting up is finished, counts down to a set value stored in cycle register 21a. Binary counter 21b repeats such an operation. In other words, a count value that is output by binary counter 21b increases and decreases repeatedly on a cyclical basis. Binary counter 21b outputs the count value to each of first comparison circuit 22a, second comparison circuit 23a, and third comparison circuit 24a.

Figure 7:
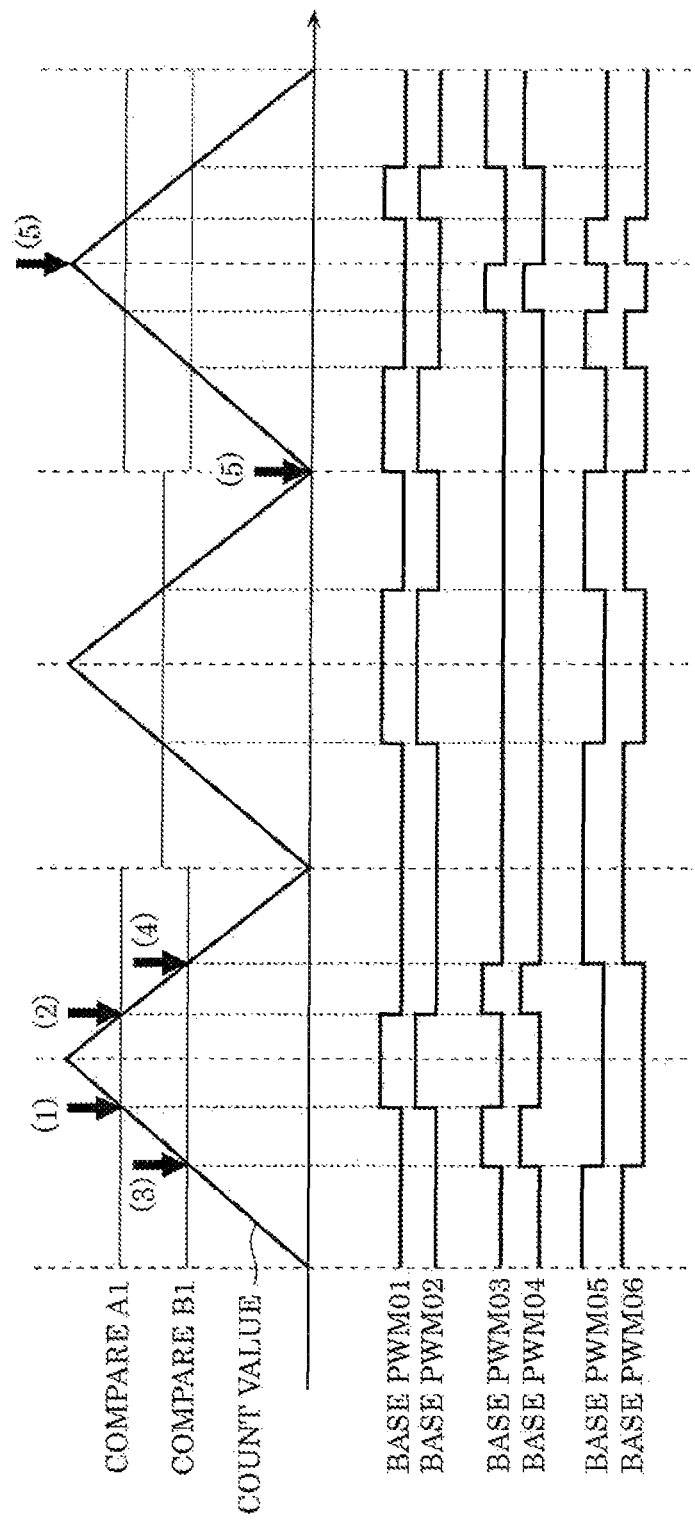
FIG. 7 illustrates six types of fundamental waveforms.

First fundamental waveform generation circuit 22 includes compare register A1, compare register B1, and first comparison circuit 22a. First comparison circuit 22a generates six types of fundamental waveforms by comparing the count value output from binary counter 21b, a set value of compare register A1, and a set value of compare register B1. FIG. 7 illustrates six types of fundamental waveforms. The triangular wave illustrated in FIG. 7 shows the count value output from binary counter 21b. Compare A1 indicates the set value of compare register A1, and compare B1 indicates the set value of compare register B1. Bases PWM01 to PWM06 are the six types of fundamental waveforms generated by first comparison circuit 22a. Bases PWM01 to PWM06 correspond one-to-one with commutation insertion circuits 01 to 06, and first comparison circuit 22a outputs each of bases PWM01 to PWM06 to a corresponding one of the commutation insertion circuits. Note that a base PWM is also referred to as an input PWM signal.

Second fundamental waveform generation circuit 23 includes compare register A2, compare register B2, and second comparison circuit 23a. Third fundamental waveform generation circuit 24 includes compare register A3, compare register B3, and third comparison circuit 24a. The configurations of second fundamental waveform generation circuit 23 and third fundamental waveform generation circuit 24 are the same as that of first fundamental waveform generation circuit 22, and a detailed description will be omitted.

Commutation insertion circuit 01 receives base PWM01 as the input PWM signal, and outputs PWM01 obtained by delaying the logic change timing of base PWM01. In this way, it is possible to make the logic change timing of PWM01 different from the logic change timings of PWM02 to PWM04 as illustrated in FIG. 4 or FIG. 5. Note that the delay may be 0. The same applies to commutation insertion circuits 02 to 18.

Figure 8:
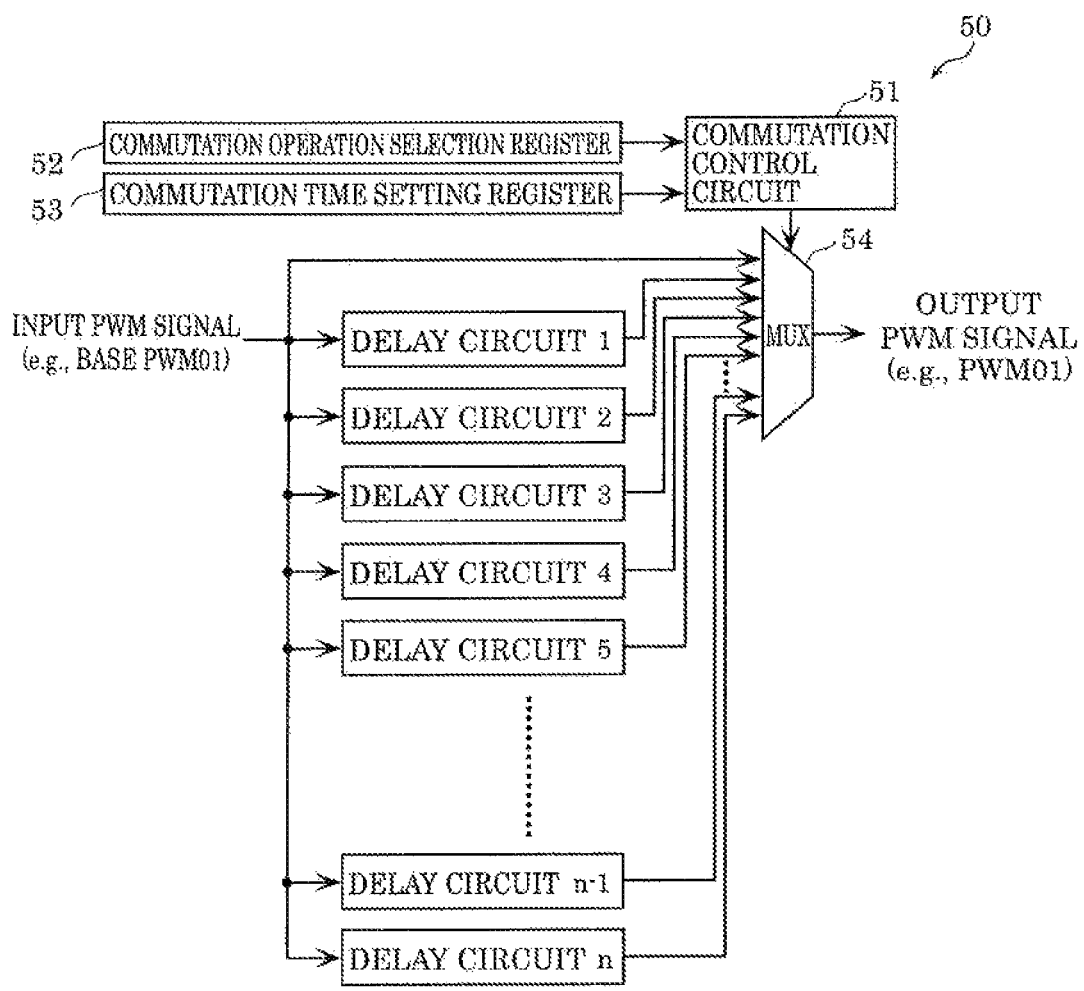
FIG. 8 illustrates a configuration of a commutation insertion circuit according to a comparative example.
Figure 9:
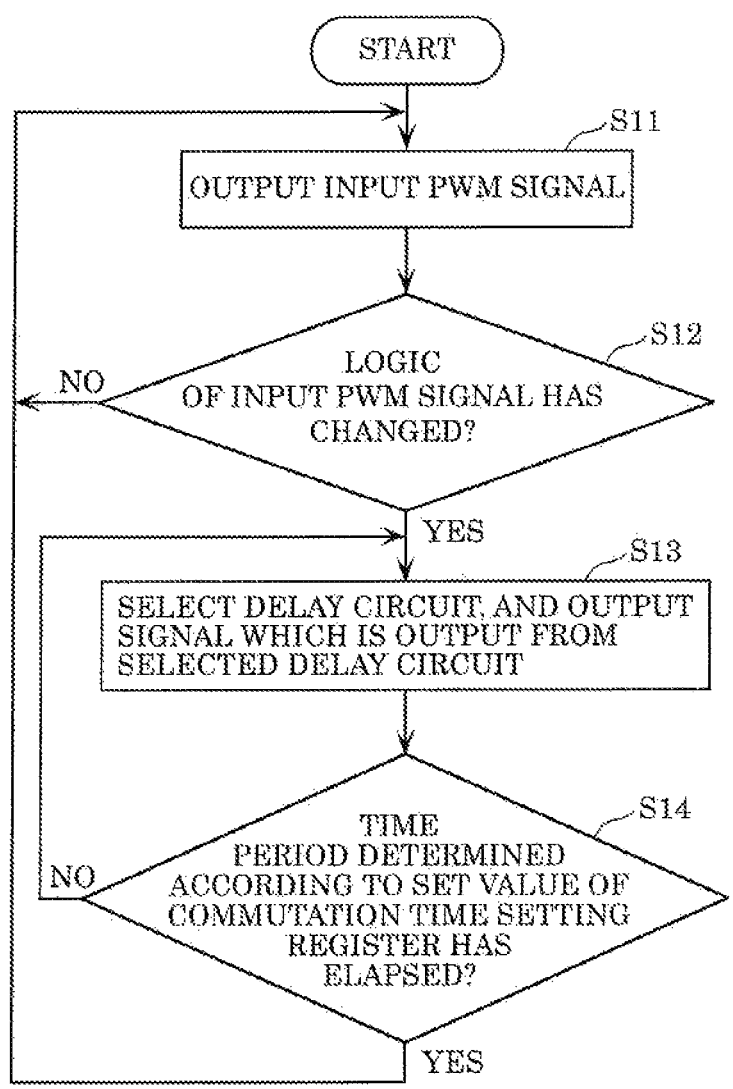
FIG. 9 is a flow chart of an operation of the commutation insertion circuit according to the comparative example.

Configuration and Operation of Commutation Insertion Circuits According to Comparative Example Prior to describing a configuration and an operation of the commutation insertion circuits included in matrix converter control device 20, a configuration and an operation of commutation insertion circuits according to a comparative example will be described. FIG. 8 illustrates a configuration of a commutation insertion circuit according to the comparative example. FIG. 9 is a flow chart of an operation of the commutation insertion circuit according to the comparative example.

As illustrated in FIG. 8, commutation insertion circuit 50 according to the comparative example includes a plurality of delay circuits (specifically, delay circuits 1 to n), commutation control circuit 51, commutation operation selection register 52, commutation time setting register 53, and multiplexer 54.

Each delay circuit delays the input PWM signal by an amount of delay predetermined for the delay circuit, and constantly outputs the resultant signal.

Normally, commutation control circuit 51 outputs the input PWM signal as is, by controlling multiplexer 54 (S11). Commutation control circuit 51 determines whether the logic of the input PWM signal has changed (S12). Commutation control circuit 51 outputs the input PWM signal as is (S11) until the logic of the input PWM signal changes (NO in S12). When the logic of the input PWM signal changes (YES in S12), commutation control circuit 51 selects any one of delay circuits 1 to n according to the set value of commutation operation selection register 52, and outputs, as an output PWM signal, a signal output from the selected delay circuit, by controlling multiplexer 54 (S13).

Next, commutation control circuit 51 determines whether a time period determined according to the set value of commutation time setting register 53 has elapsed since the logic of the input PWM signal changed (S14). Until the time period determined according to the set value of commutation time setting register 53 elapses since the logic of the input PWM signal changed (NO in S14), commutation control circuit 51 outputs, as the output PWM signal, the signal output from the selected delay circuit (S13). When commutation control circuit 51 determines that the time period determined according to the set value of commutation time setting register 53 has elapsed since the logic of the input PWM signal changed (YES in S14), commutation control circuit 51 outputs the input PWM signal as is, by controlling multiplexer 54 (S11).

Commutation insertion circuit 50 according to such a comparative example requires many delay circuits to correspond to the number of commutation waveforms (that is, the waveforms illustrated in FIG. 4 and FIG. 5; or in other words, commutation patterns). Since various commutation waveforms have been proposed in the past, and proposals of new commutation waveforms are expected in the future, the number of delay circuits required to support various commutation waveforms will be enormous. Therefore, it is difficult to realize commutation insertion circuit 50 supporting all the commutation waveforms, and in reality, the commutation waveforms are limited. Limiting the commutation waveforms causes a decrease in the versatility of matrix converter control device 20. Moreover, there is a risk of not being able to achieve efficient power conversion.

Figure 10:
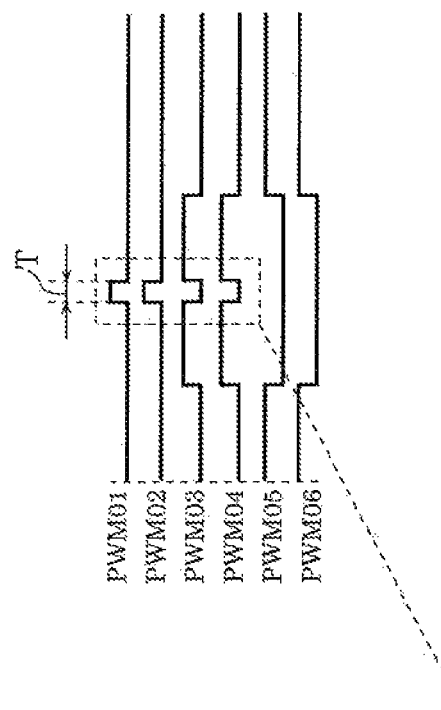
FIG. 10 illustrates overlapping of commutation waveforms.
Figure 10:
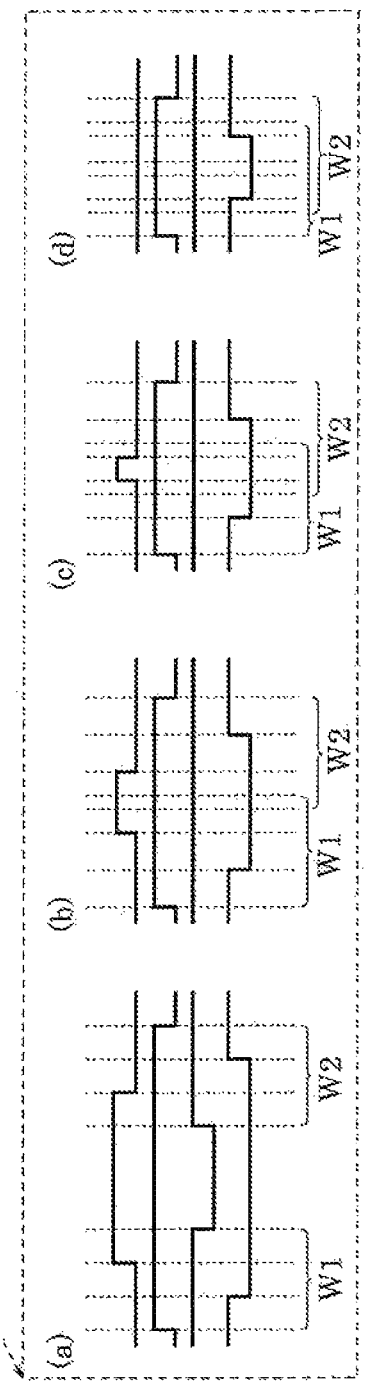

With commutation insertion circuit 50 according to the comparative example, it is also difficult to address overlapping of commutation waveforms. FIG. 10 illustrates overlapping of commutation waveforms. As illustrated in part (a) of FIG. 10, when time length T in which the logics of the input PWM signals change is long, there is no overlap of commutation waveform W1 during the initial logic change and commutation waveform W2 during the next logic change. However, as illustrated in parts (b) to (d) of FIG. 10, when time length T in which the logics of the input PWM signals change is short, there is an overlap of commutation waveform W1 during the initial logic change and commutation waveform W2 during the next logic change. In such cases, rather than disregarding commutation waveform W1 or commutation waveform W2, a waveform which combines commutation waveform W1 and commutation waveform W2 is necessary. However, as illustrated in parts (b) to (d) of FIG. 10, since the overlapping waveforms are different depending on the length of time length T, an enormous number of delay circuits is required to cover all the overlapping waveforms.

As described with reference to commutation insertion circuit 50 according to the comparative example, the commutation insertion circuits included in matrix converter control device 20 need to support a plurality of commutation waveforms. In addition, the commutation insertion circuits included in matrix converter control device 20 need to address the overlapping of commutation waveforms. It is difficult cost-wise to prepare all the commutation waveforms, so it is common to use commutation insertion circuits for which commutation waveforms are limited depending on the application. There are also cases where the commutation insertion circuits are realized using expensive programmable logic circuits such as field-programmable gate arrays (FPGAs), and commutation waveforms are changed depending on the application.

Configuration of Commutation Insertion Circuit According to Embodiment

Figure 11:
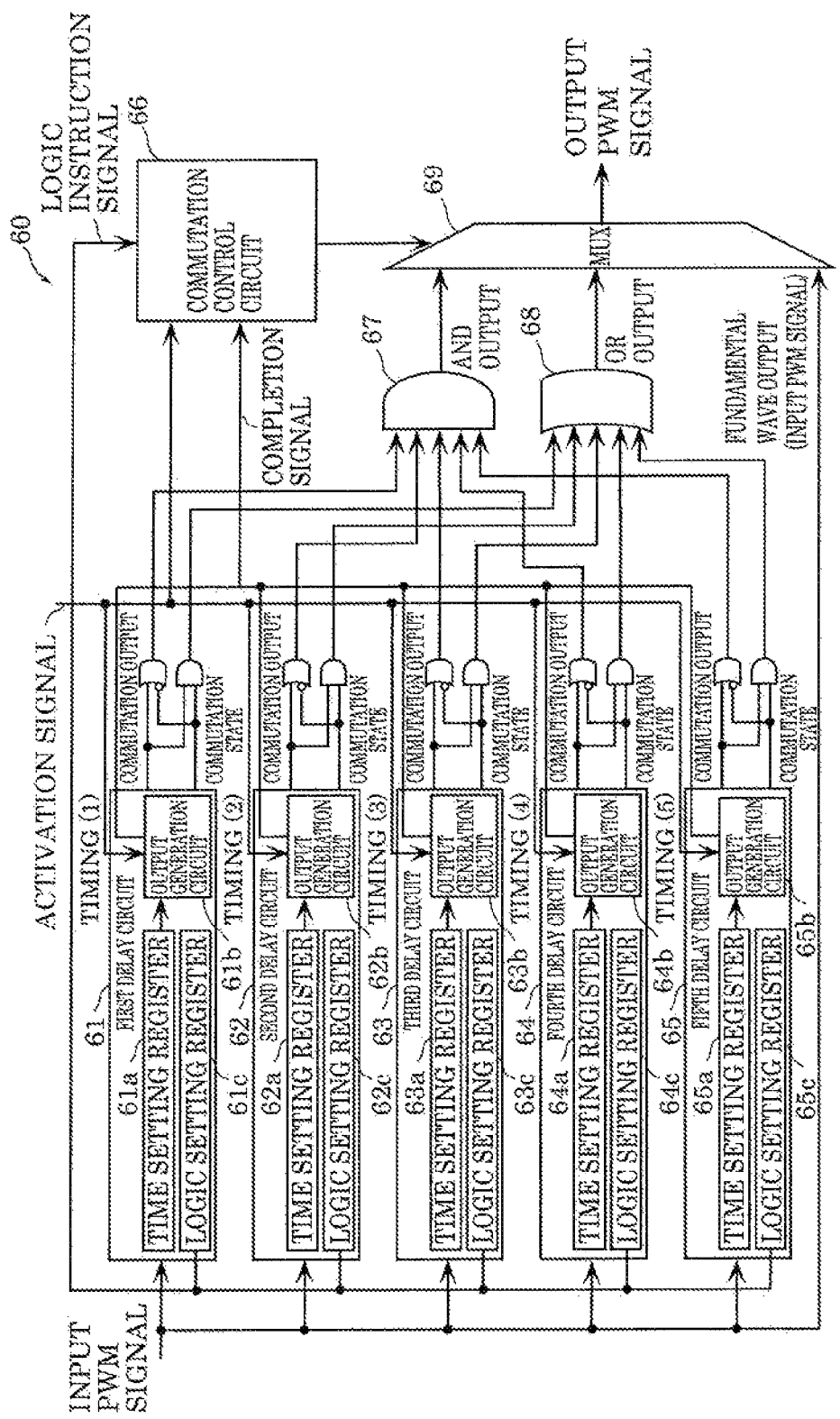
FIG. 11 illustrates a configuration of a commutation insertion circuit according to the embodiment.

In view of such circumstances, commutation insertion circuit 60 illustrated in FIG. 11 is used in matrix converter control device 20. FIG. 11 illustrates a configuration of commutation insertion circuit 60 according to the embodiment.

Commutation insertion circuit 60 includes five delay circuits, namely first delay circuit 61, second delay circuit 62, third delay circuit 63, fourth delay circuit 64, and fifth delay circuit 65, commutation control circuit 66, AND circuit 67, OR circuit 68, and multiplexer 69.

Note that in the following description, commutation insertion circuit 60 is equivalent to commutation insertion circuit 01 in FIG. 6. That is to say, the control target of commutation insertion circuit 60 is SW01, the input PWM signal in FIG. 11 is base PWM01, and the output PWM signal in FIG. 11 is PWM01. Note that in matrix converter control device 20, commutation insertion circuits 02 to 18 have the same configuration as that of commutation insertion circuit 60.

Each of the five delay circuits includes a time setting register, a logic setting register, and an output generation circuit. The five delay circuits correspond one-to-one with logic change timings (1) to (5) of base PWM01 to base PWM06 in FIG. 7. The five delay circuits output commutation waveforms at different timings.

In a period starting at timing (1) (specifically, a certain period which finishes at the end of a completion period which will be described later), first delay circuit 61 (more specifically, output generation circuit 61b) performs a delay output operation of delaying the input PWM signal by a delay time indicated by a set value of time setting register 61a and outputting the resultant signal. Note that the delay time may be 0, and the present Description encompasses the cases where the input PWM signal is delayed by the delay time 0 (that is, the input PWM signal is not delayed) before being output. First delay circuit 61 does not perform the delay output operation at timings (2) to (5). Timing (1) is timing at which the count value and the set value of compare register A1 coincide during the count-up performed by binary counter 21b.

In a period starting at timing (2), second delay circuit 62 (more specifically, output generation circuit 62b) performs a delay output operation of delaying the input PWM signal by a delay time indicated by a set value of time setting register 62a and outputting the resultant signal. Timing (2) is timing at which the count value and, the sot value of compare register A1 coincide during the count-down performed by binary counter 21b. Second delay circuit 62 does not perform the delay output operation at timing (1) and timings (3) to (5).

In a period starting at timing (3), third delay circuit 63 (more specifically, output generation circuit 63b) performs a delay output operation of delaying the input PWM signal by a delay time indicated by a set value of time setting register 63a and outputting the resultant signal. Timing (3) is timing at which the count value and the set value of compare register B1 coincide during the count-up performed by binary counter 21b. Third delay circuit 63 does not perform the delay output operation at timings (1), (2), (4), and (5).

In a period starting at timing (4), fourth delay circuit 64 (more specifically, output generation circuit 64b) performs a delay output operation of delaying the input PWM signal by a delay time indicated by a set value of time setting register 64a and outputting the resultant signal. Timing (4) is timing at which the count value and the set value of compare register B1 coincide during the count-down performed by binary counter 21b. Fourth delay circuit 64 does not perform the delay output operation at timings (1) to (3) and timing (5).

In a period starting at timing (5), fifth delay circuit 65 (more specifically, output generation circuit 65b) performs a delay output operation of delaying the input PWM signal by a delay time indicated by a set value of time setting register 65a and outputting the resultant signal. Timing (5) is timing at which the count value of binary counter 21b reaches the maximum (in other words, the overflow timing) and timing a which the count value is reset to 0 (in other words, the underflow timing). Fifth delay circuit 65 does not perform the delay output operation at timings (1) to (4).

Each of the five delay circuits starts the delay output operation based on an activation signal notifying the timings (1) to (5). Furthermore, each of the five delay circuits outputs a completion signal to commutation control circuit 66 and stops the delay output operation when the completion period indicated by the set value of the time setting register included in the delay circuit elapses. During the period in which the delay output operation is stopped, each of the five delay circuits outputs a high-level signal to AND circuit 67 and a low-level signal to OR circuit 68.

Each of the five delay circuits delays the input PWM signal (for example, base PWM01), which is for controlling a switching element (for example, SW01) by an amount of delay set for the delay circuit, and outputs the resultant signal as the output PWM signal (for example, PWM01), at a timing corresponding to the delay circuit.

AND circuit 67 outputs a logical product of the outputs of the five delay circuits. The output of AND circuit 67 is also referred to as AND output. The AND output corresponds to a first signal.

OR circuit 68 outputs a logical sum of the outputs of the five delay circuits. The output of OR circuit 68 is also referred to as OR output. The OR output corresponds to a second signal.

Multiplexer 69 is a selector which selectively outputs OR output, AND output, and fundamental wave output which is the input PWM signal, based on the control performed by commutation control circuit 66.

Operation Example 1 of Commutation Insertion Circuit According to Embodiment

Figure 12:
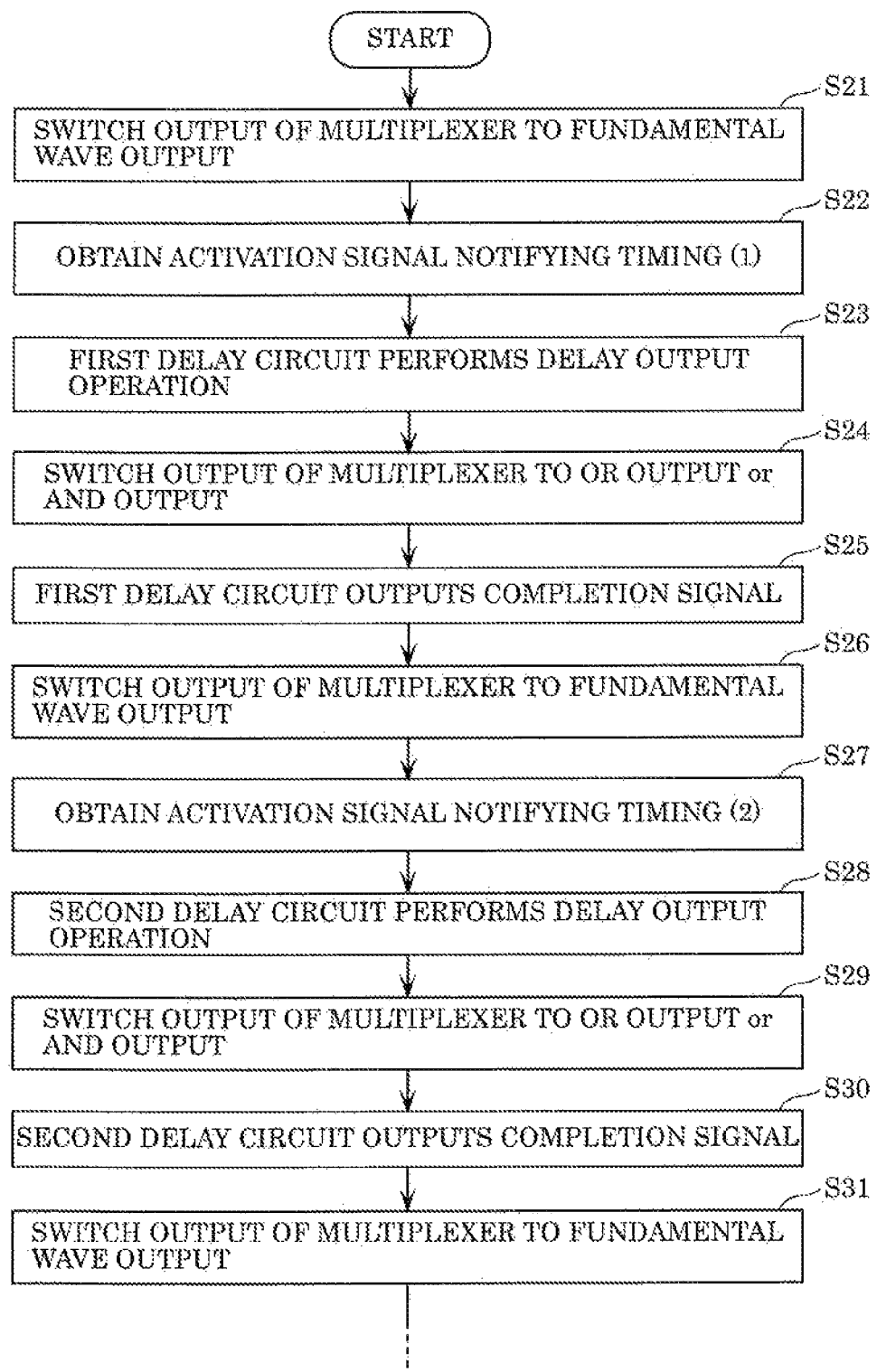
FIG. 12 is a flow chart of operation example 1 of the commutation insertion circuit according to the embodiment.
Figure 13:
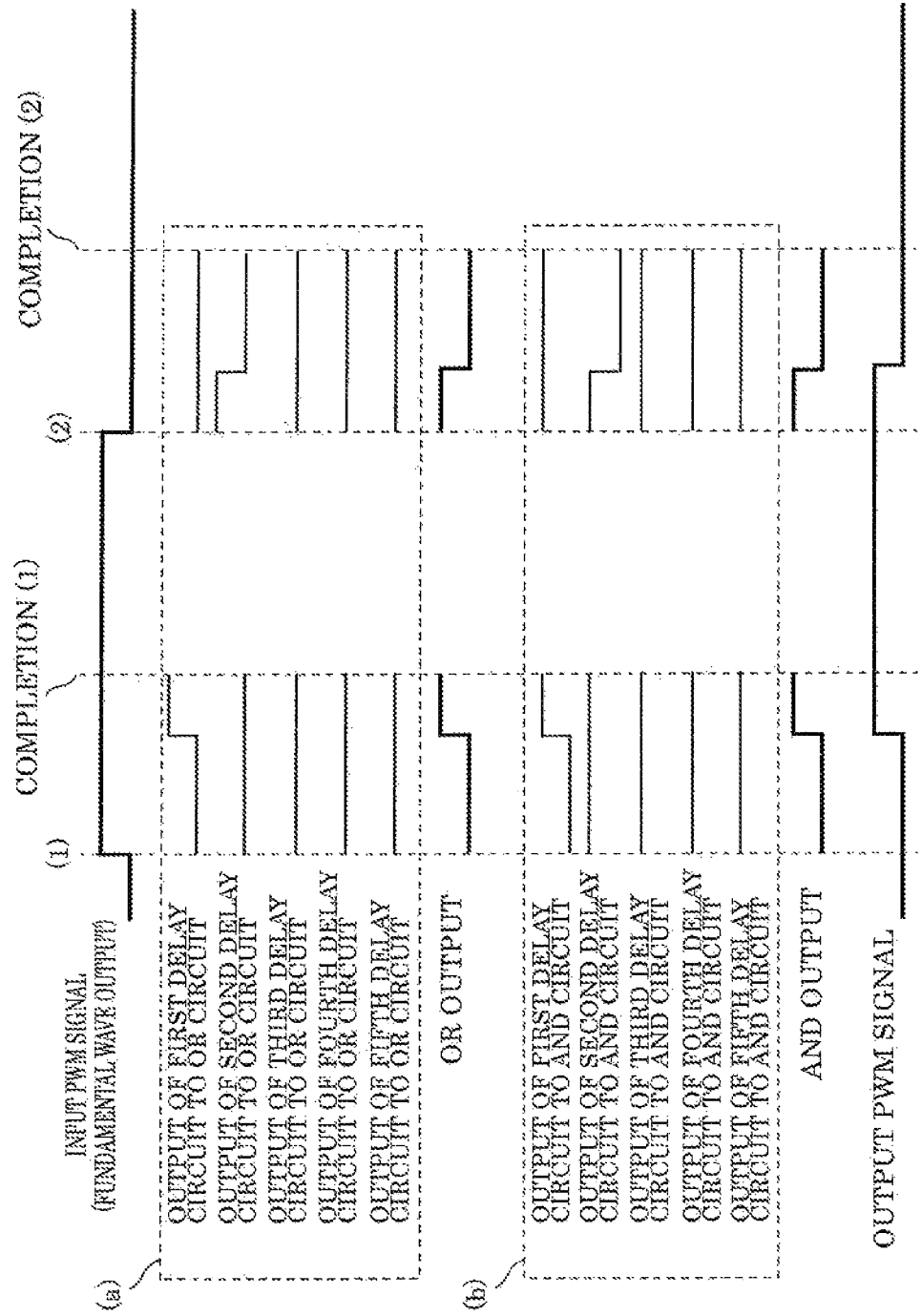
FIG. 13 illustrates a relationship between the input PWM signal, the output of the five delay circuits, and the output PWM signal in operation example 1.

Next, operation example 1 of commutation insertion circuit 60 will be described. FIG. 12 is a flow chart of operation example 1 of commutation insertion circuit 60. FIG. 13 illustrates a relationship between the input PWM signal, the output of the five delay circuits, and the output PWM signal in operation example 1.

First, commutation control circuit 66 switches the output of multiplexer 69 to the fundamental wave output (S21). In this state, the five delay circuits and commutation control circuit 66 obtain an activation signal notifying timing (1) (S22). The activation signal notifying timing (1) is obtained at timing when, for example, the count value and the set value of compare register A1 coincide during the count-up performed by binary counter 21b.

When the activation signal is obtained, first delay circuit 61 performs the delay output operation (S23). Specifically, first delay circuit 61 delays the input PWM signal by a delay time indicated by the set value of time setting register 61a, and outputs the resultant signal. The delayed input PWM signal is output to both AND circuit 67 and OR circuit 68.

Commutation control circuit 66 obtains, as a logic instruction signal, the set value of logic setting register 61c included in first delay circuit 61, and switches the output of multiplexer 69 according to the set value (S24).

When the set value of logic setting register 61c indicates OR output, commutation control circuit 66 switches the output of multiplexer 69 to OR output. As illustrated in part (a) of FIG. 13, the four delay circuits other than first delay circuit 61 each output a low-level signal to OR circuit 68 in Step S23 described above. Thus, when the output of multiplexer 69 is switched to OR output in Step S24, the output of first delay circuit 61 to OR circuit 68 is used as is, as the output PWM signal.

On the other hand, when the set value of logic setting register 61c indicates AND output, commutation control circuit 66 switches the output of multiplexer 69 to AND output. As illustrated in part (b) FIG. 13, the four delay circuits other than first delay circuit 61 each output a high-level signal to AND circuit 67 in Step S23 described above. Thus, when the output of multiplexer 69 is switched to AND output in Step S24, the output of first delay circuit 61 to AND circuit 67 is used as is, as the output PWM signal.

When the completion period starting at timing (1) and indicated by the set value of time setting register 61a elapses, first delay circuit 61 outputs a completion signal to commutation control circuit 66 (S25). With the obtainment of the completion signal serving as a trigger, commutation control circuit 66 switches the output of multiplexer 69 to the fundamental wave output (S26). In this state, the five delay circuits and commutation control circuit 66 obtain an activation signal notifying timing (2) (S27). The activation signal notifying timing (2) is obtained at timing when, for example, the count value and the et value of compare register A1 coincide during the count-down performed by binary counter 21b.

When the activation signal is obtained, second delay circuit 62 performs the delay output operation (S28). Specifically, second delay circuit 62 delays the input PWM signal by a delay time indicated by the set value of time setting register 62a, and outputs the resultant signal. The delayed input PWM signal is output to both AND circuit 67 and OR circuit 68.

Commutation control circuit 66 obtains, as a logic instruction signal, the set value of logic setting register 62c included in second delay circuit 62, and switches the output of multiplexer 69 according to the set value (S29).

When the set value of logic setting register 62c indicates OR output, commutation control circuit 66 switches the output of multiplexer 69 to OR output. As illustrated impart (a) of FIG. 13, the four delay circuits other than second delay circuit 62 each output a low-level signal to OR circuit 68 in Step S28 described above. Thus, when the output of multiplexer 69 is switched to OR output in Step S29, the output of second delay circuit 62 to OR circuit 68 is used as is, as the output PWM signal.

On the other hand, when the set value of logic setting register 62c indicates AND output, commutation control circuit 66 switches the output of multiplexer 69 to AND output. As illustrated in part (b) of FIG. 13, the four delay circuits other than second delay circuit 62 each output a high-level signal to AND circuit 67 in Step S28 described above. Thus, when the output of multiplexer 69 is switched to AND output in Step S29, the output of second delay circuit 62 to AND circuit 67 is used as is, as the output PWM signal.

When the completion period starting at timing (2) and indicated by the set value of time setting register 62a elapses, second delay circuit 62 outputs a completion signal to commutation control circuit 66 (S30). With the obtainment of the completion signal serving as a trigger, commutation control circuit 66 switches the output of multiplexer 69 to the fundamental wave output (S31). Thereafter, the same processing is performed at timings (3) to (5), for example.

Operation Example 2 of Commutation Insertion Circuit According to Embodiment

Figure 14:
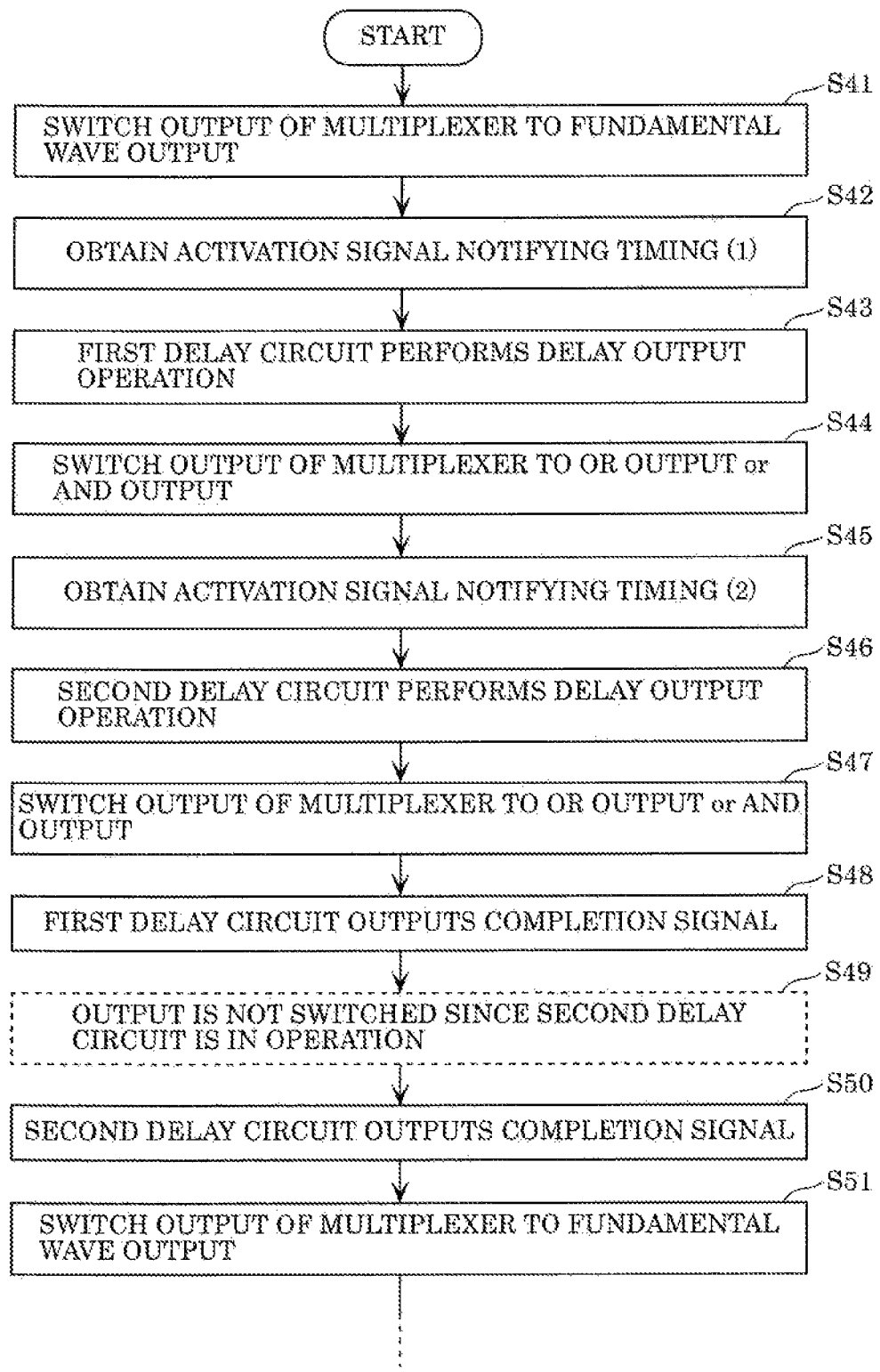
FIG. 14 is a flow chart of operation example 2 of the commutation insertion circuit according to the embodiment.
Figure 15:
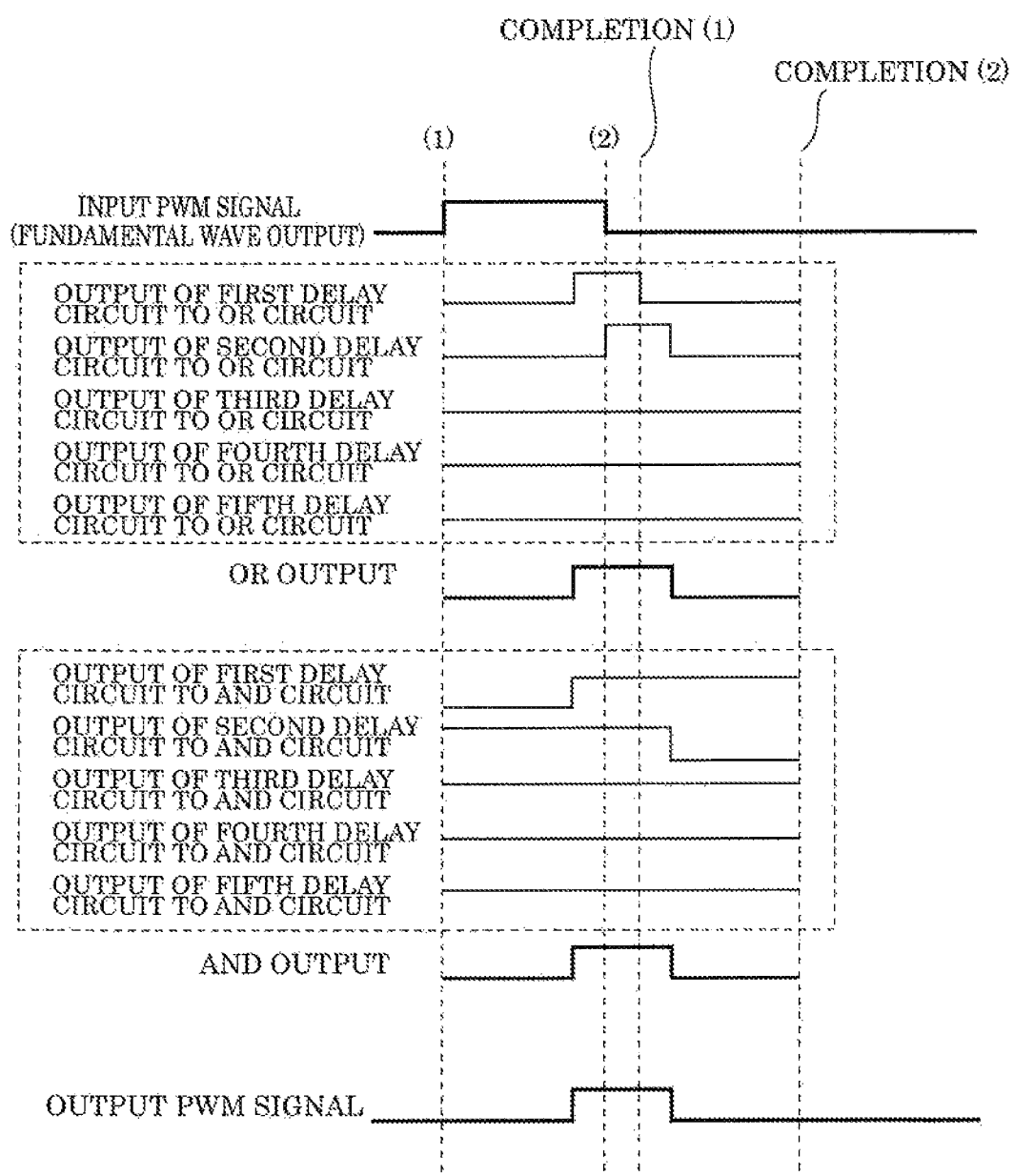
FIG. 15 is a first diagram illustrating a relationship between the input PWM signal, the output of the five delay circuits, and the output PWM signal in operation example 2.
Figure 16:
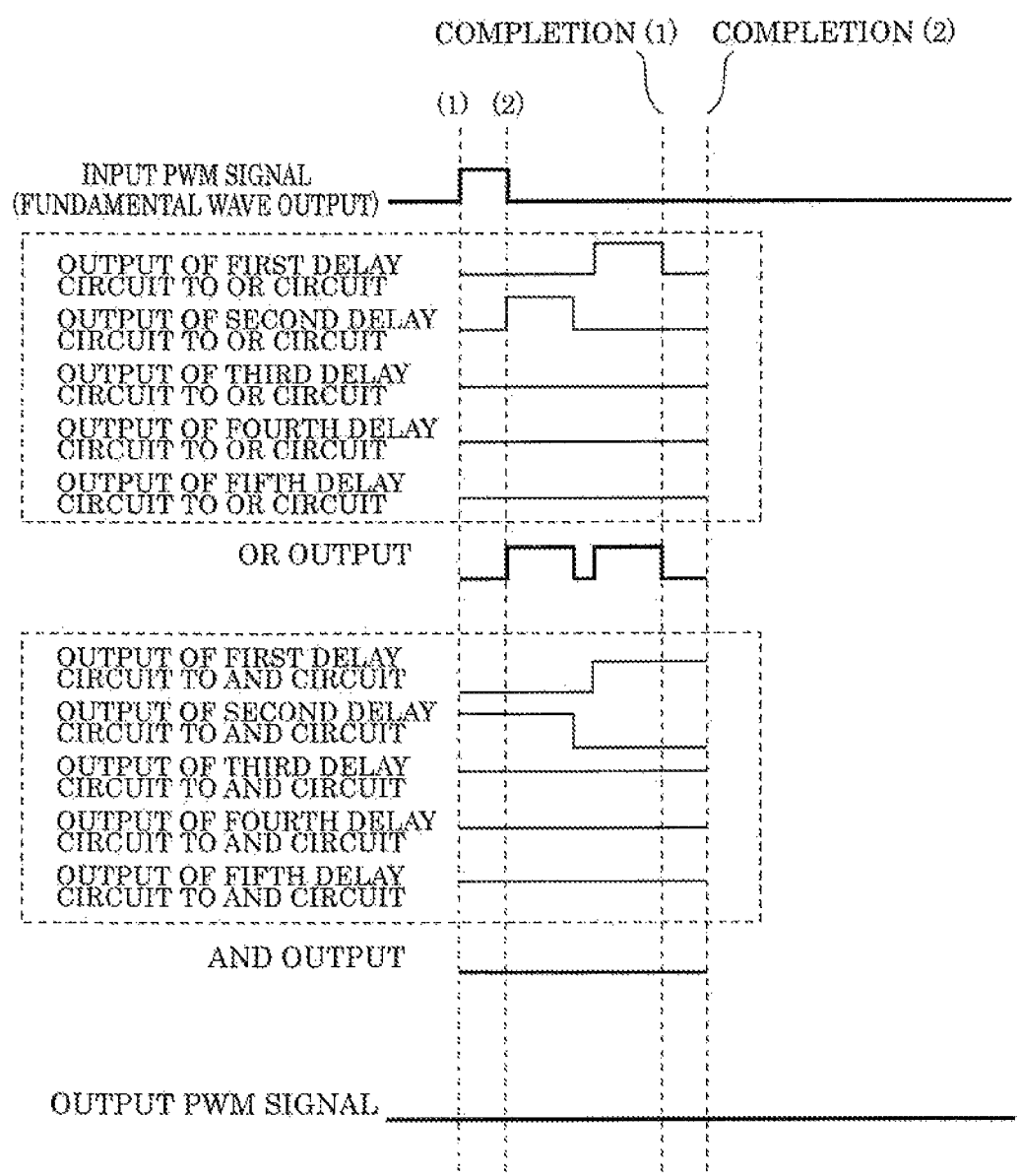
FIG. 16 is a second diagram illustrating a relationship between the input PWM signal, the output, of the five delay circuits, and the output PWM signal in operation example 2.

As described in operation example 1, AND circuit 67 and OR circuit 68 do not have an impact on the output PWM signal when commutation waveforms do not overlap. When commutation waveforms overlap, however, AND circuit 67 and OR circuit 68 generate waveforms in which two commutation waveforms overlap. Hereinafter, operation example 2 of commutation insertion circuit 60 will be described. FIG. 14 is a flow chart of operation example 2 of commutation insertion circuit 60. FIG. 15 and FIG. 16 each illustrate a relationship between the input PWM signal, the output of the five delay circuits, and the output PWM signal in operation example 2.

Steps S41 to S44 in FIG. 14 are the same as in operation example 1. Commutation control circuit 66 switches the output of multiplexer 69 to the fundamental wave output (S41), and in this state, the five delay circuits and commutation control circuit 66 obtain an activation signal notifying timing (1) (S42). When the activation signal is obtained, first delay circuit 61 performs the delay output operation (S43), and commutation control circuit 66 switches the output of multiplexer 69 to OR output or AND output according to the set value of logic setting register 61c included in first delay circuit 61 (S44).

Next, the five delay circuits and commutation control circuit 66 obtain an activation signal notifying timing (2) (S45). When the activation signal is obtained, second delay circuit 62 performs the delay output operation (S46), and commutation control circuit 66 switches the output of multiplexer 69 to OR output or AND output according to the set value of logic setting register 62c included in second delay circuit 62 (S47). In other words, in operation example 2, second delay circuit 62 performs the delay output operation before the completion signal is output from first delay circuit 61. Consequently, commutation waveforms overlap. When OR output is selected in Step S47, the output of first delay circuit 61 and the output of second delay circuit 62 are added by OR logic, whereas when AND output is selected in Step S47, the output of first delay circuit 61 and the output of second delay circuit 62 are added by AND logic. That is to say, commutation waveforms are automatically combined as illustrated in FIG. 15 and FIG. 16. Note that FIG. 16 illustrates the case where timing (2) comes earlier than timing (2) in FIG. 15.

After that, first delay circuit 61 outputs the completion signal to commutation control circuit 66 (S48). In operation example 1, commutation control circuit 66 switches the output of multiplexer 69 to the fundamental wave output. In operation example 2, however, commutation control circuit 66 does not switch the output of multiplexer 69 since second delay circuit 62 is in operation (S49).

After that, second delay circuit 62 outputs the completion signal to commutation control circuit 66 (S50). With the obtainment of the completion signal serving as a trigger, commutation control circuit 66 switches the output of multiplexer 69 to the fundamental wave output (S51).

As described above, with commutation insertion circuit 60, commutation waveforms are automatically combined when commutation waveforms overlap.

Advantageous Effects Etc.

As described above, matrix converter control device 20 includes a plurality of delay circuits which correspond to logic change timings ((1) to (5) in FIG. 7) of a plurality of pulse width modulation (PWM) signals (for example, base PWM01 to base PWM06) for controlling ON and OFF states of a plurality of switching elements (for example, SW01 to SW06) included in matrix converter 10. In the above embodiment, the plurality of delay circuits are first delay circuit 61, second delay circuit 62, third delay circuit 63, fourth delay circuit 64, and fifth delay circuit 65. Each of the plurality of delay circuits delays a target PWM signal (for example, base PWM01) included in the plurality of PWM signals by an amount of delay set for the delay circuit in a time period starting at one of the logic change timings which corresponds to the delay circuit, the target PWM signal being a signal for controlling a target switching element (for example, SW01) included in the plurality of switching elements.

Since such matrix convertor control device 20 includes a plurality of delay circuits to correspond to, the logic change timings of a plurality of PWM signals, the control algorithm of matrix converter control device 20 is simplified. Matrix converter control device 20, therefore, can be realized as an inexpensive integrated circuit such as a microcomputer having high versatility.

For example, matrix converter control device 20 further includes: AND circuit 67 which outputs a logical product of outputs of the plurality of delay circuits as a first signal; and OR circuit 68 which outputs a logical sum of the outputs of the plurality of delay circuits as a second signal.

Such matrix converter control device 20 is capable of easily combining commutation waveforms when commutation waveforms overlap. Matrix converter control device 20 does not need an enormous number of delay circuits required by commutation insertion circuit 50 according to the comparative example to address the overlap of commutation waveforms. Despite that, matrix converter control device 20 can achieve all the commutation patterns which will be added in the future. Moreover, since matrix converter control device 20 has a simple and highly versatile configuration, it can be realized as an inexpensive integrated circuit such as a microcomputer.

For example, matrix converter control device 20 further includes commutation control circuit 66 which outputs the target PWM signal to the target switching element, and at each of the logic change timings, switches a signal to be output to the target switching element from the target PWM signal to one of the first signal and the second signal.

Through the switching of the signals, such matrix converter control device 20 is capable of inserting commutation waveforms generated by a delay circuit into the fundamental waveform of the target PWM signal.

For example, a total number of the plurality of delay circuits which perform signal processing on the target PWM signal is five.

With such matrix converter control device 20, since the total number of delay circuits corresponding to a single PWM signal is limited to five, it is possible to inhibit an increase in the circuit size. Matrix converter control device 20, therefore, can be realized, as an inexpensive integrated circuit such as a microcomputer.

For example, the logic change timings are determined based on a comparison between a count value which repeatedly increases and decreases on a cyclical basis and two thresholds having different values. The two thresholds are, for example, the set, value of compare register A1 and the set value of compare register B1.

Such matrix converter control device 20 is capable of determining the logic change timings based on the comparison between the count value and the two thresholds having different values.

Power conversion system 100 includes matrix converter control device 20 and matrix converter 10.

Such power conversion system 100 yields the same advantageous effects as those of matrix converter control device 20.

OTHER EMBODIMENTS

Although the embodiment has been described above, the present disclosure is not limited to the above embodiment.

For example, although a single commutation insertion circuit includes five delay circuits in the above embodiment, the total number of delay circuits included in a single commutation insertion circuit is not limited to five. For example, the fifth delay circuit may be omitted; the total number of delay circuits included in a single commutation insertion circuit may be four. The total number of delay circuits included in a single commutation insertion circuit may be six or greater. The total number of delay circuits is not limited in particular, so long as the delay circuits correspond to the logic change timings of the PWM signals.

The term "timing" used in the embodiment need not be interpreted in a strict sense. The term "timing" in the embodiment may be interpreted as a period of time.

The circuit configuration described in the above embodiment is a mere example, and the present disclosure is not limited to the above circuit configuration. That is to say, as well as the above circuit configuration, the present disclosure also encompasses circuits capable of achieving the characteristic functions of the present disclosure. For example, the present disclosure also encompasses a circuit in which an element such as a switching element (a transistor), a resister element, or a capacitor element is connected to another element in series or parallel within the scope in which the functions of the above circuit configuration can be achieved.

In the above embodiment, the constituent elements such as the control circuit are realized in the form of a hardware product. The constituent elements such as the control circuit, however, may be realized through execution of software programs appropriate for the constituent elements. The constituent elements such as the control circuit may be realized by a program execution unit such as a central processing unit (CPU) or a processor reading and executing a software program recorded on a recording medium such as a hard disk or a semiconductor memory.

In addition, processing performed by a particular processing unit in the above embodiment may be performed by another processing unit. Moreover, in the operation examples described, in the above embodiment, the order in which a plurality of processes are performed may be changed, and a plurality of processes may be performed in parallel.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure. For example, the present disclosure may be realized as a method for controlling a matrix converter.

INDUSTRIAL APPLICABILITY

A matrix converter control device according to the present disclosure is useful as a power conversion device capable of generating AC power of a new frequency from an AC power source.

What is claimed is:

1. A matrix converter control device, comprising:
a plurality of delay circuits which correspond to logic change timings of a plurality of pulse width modulation (PWM) signals for controlling ON and OFF states of a plurality of switching elements included in a matrix converter, wherein
each of the plurality of delay circuits delays a target PWM signal included in the plurality of PWM signals by an amount of delay set for the delay circuit in a time period starting at one of the logic change timings which corresponds to the delay circuit, the target PWM signal being a signal for controlling a target switching element included in the plurality of switching elements.

2. The matrix converter control device according to claim 1, further comprising:
an AND circuit which outputs a logical product of outputs of the plurality of delay circuits as a first signal; and
an OR circuit which outputs a logical sum of the outputs of the plurality of delay circuits as a second signal.

3. The matrix converter control device according to claim 2, further comprising:
a control circuit which outputs the target PWM signal to the target switching element, and at each of the logic change timings, switches a signal to be output to the target switching element from the target PWM signal to one of the first signal and the second signal.

4. The matrix converter control device according to claim 1, wherein
a total number of the plurality of delay circuits which perform signal processing on the target PWM signal is five.

5. The matrix converter control device according to claim 1, wherein
the logic change timings are determined based on a comparison between a count value which repeatedly increases and decreases on a cyclical basis and two thresholds having different values.

6. A power conversion system, comprising:
the matrix converter control device according to claim 1; and
the matrix converter.

* * * * *